United States Patent
Bhageria et al.

(10) Patent No.: US 10,926,412 B2
(45) Date of Patent: Feb. 23, 2021

(54) COORDINATING ROBOTIC APPARATUS DELIVERIES

(71) Applicant: INTERNATIONAL BUSINESS MACHINES CORPORATION, Armonk, NY (US)

(72) Inventors: Gopal K. Bhageria, Overland Park, KS (US); Vijay Ekambaram, Tamilnadu (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/737,529

(22) Filed: Jan. 8, 2020

(65) Prior Publication Data

US 2020/0139549 A1 May 7, 2020

Related U.S. Application Data

(63) Continuation of application No. 16/030,040, filed on Jul. 9, 2018, now Pat. No. 10,576,634, which is a
(Continued)

(51) Int. Cl.
*B25J 9/16* (2006.01)
*G06Q 10/00* (2012.01)
(Continued)

(52) U.S. Cl.
CPC ...... *B25J 9/1687* (2013.01); *G05B 19/41815* (2013.01); *G05D 1/104* (2013.01);
(Continued)

(58) Field of Classification Search
None
See application file for complete search history.

(56) References Cited

U.S. PATENT DOCUMENTS 4,655,676 A 4/1987 Jannborg
4,674,048 A 6/1987 Okumura
(Continued)

FOREIGN PATENT DOCUMENTS

EP 0511396 B1 11/1992

OTHER PUBLICATIONS

Esc Aerospace; UAVs and robotics move into Maintenance, Repair, and Overhaul (MRO); Sep. 9, 2015; Retrieved from the Internet Jan. 8, 2016; URL: http://www.esc-aerospace.com/?p=3800; 2 pages.
(Continued)

*Primary Examiner* — Nicholas K Wiltey
(74) *Attorney, Agent, or Firm* — Schmeiser, Olsen & Watts; Nicholas L. Cadmus

(57) ABSTRACT

A method and system for automatically supplying parts for an assembly line is provided. The method includes generating and executing an action plan specifying movements associated with a robotic apparatus associated with the assembly line, items required for the assembly line, and a vehicle associated with providing the items for the robotic apparatus. The vehicle is directed to a location comprising the items and a first item is selected and retrieved upon arriving at the location. A measured weight of the first item is compared to a predetermined maximum weight threshold for delivery by the vehicle and a resulting delivery process with respect to the vehicle, first item, and robotic apparatus is executed. A notification indicating details associated with the delivery process is transmitted to the robotic apparatus.

20 Claims, 5 Drawing Sheets

Related U.S. Application Data continuation of application No. 15/081,241, filed on Mar. 25, 2016, now Pat. No. 10,078,330.

(51) Int. Cl.
  *G05B 19/418* (2006.01)
  *G05D 1/10* (2006.01)
(52) U.S. Cl.
  CPC ... *G06Q 10/00* (2013.01); *G05B 2219/32388* (2013.01); *Y02P 90/02* (2015.11); *Y10S 901/01* (2013.01)

(56) References Cited

U.S. PATENT DOCUMENTS

| | | | |
|---|---|---|---|
| 8,412,400 B2 | 4/2013 | D'Andrea | |
| 8,444,369 B2 | 5/2013 | Watt | |
| 8,483,869 B2 | 7/2013 | Wurman | |
| 8,606,392 B2 | 12/2013 | Wurman | |
| 8,649,899 B2 | 2/2014 | Wurman | |
| 8,805,574 B2 | 8/2014 | Stevens | |
| 8,892,240 B1 | 11/2014 | Vliet | |
| 8,972,045 B1 | 3/2015 | Mountz | |
| 9,242,799 B1 | 1/2016 | O'Brien | |
| 9,327,952 B1 | 5/2016 | Kolharkar | |
| 9,346,619 B1 | 5/2016 | O'Brien | |
| 9,436,184 B2 | 9/2016 | D Andrea | |
| 9,446,846 B1 | 9/2016 | Harms | |
| 9,492,923 B2 | 11/2016 | Wellman | |
| 9,663,292 B1 | 5/2017 | Brazeau | |
| 9,688,472 B1 | 6/2017 | Stubbs | |
| 9,694,976 B1 | 7/2017 | Wurman | |
| 9,714,139 B1 | 7/2017 | Aggarwal | |
| 9,718,188 B2 | 8/2017 | Stubbs | |
| 9,731,420 B1 | 8/2017 | Yarlagadda | |
| 9,738,449 B1 | 8/2017 | Palamarchuk | |
| 9,764,836 B1 | 9/2017 | Elzinga | |
| 9,783,364 B2 | 10/2017 | Worsley | |
| 10,078,330 B2 | 9/2018 | Bhageria | |
| 10,576,634 B2 * | 3/2020 | Bhageria | G05D 1/104 |
| 2004/0193319 A1 | 9/2004 | Gross | |
| 2006/0259195 A1 | 11/2006 | Eliuk | |
| 2011/0037839 A1 | 2/2011 | Kurth | |
| 2014/0098990 A1 | 4/2014 | Vian | |
| 2014/0100715 A1 | 4/2014 | Mountz | |
| 2014/0100769 A1 | 4/2014 | Wurman | |
| 2014/0100998 A1 | 4/2014 | Mountz | |
| 2014/0100999 A1 | 4/2014 | Mountz | |
| 2014/0201094 A1 | 7/2014 | Herrington | |
| 2014/0212249 A1 | 7/2014 | Kawano | |
| 2014/0214195 A1 | 7/2014 | Worsley | |
| 2014/0214196 A1 | 7/2014 | Worsley | |
| 2014/0214234 A1 | 7/2014 | Worsley | |
| 2014/0228999 A1 | 8/2014 | D Andrea | |
| 2014/0254896 A1 | 9/2014 | Zhou | |
| 2014/0297555 A1 | 10/2014 | Kawano | |
| 2014/0333761 A1 | 11/2014 | Porter | |
| 2014/0365258 A1 | 12/2014 | Vestal | |
| 2015/0052025 A1 | 2/2015 | Apsley | |
| 2015/0066283 A1 | 3/2015 | Wurman | |
| 2015/0088307 A1 | 3/2015 | Ackerman | |
| 2015/0088767 A1 | 3/2015 | Varadarajan | |
| 2015/0227882 A1 | 8/2015 | Bhatt | |
| 2015/0254758 A1 | 9/2015 | Wadhawan | |
| 2015/0269520 A1 | 9/2015 | Knapp | |
| 2015/0269521 A1 | 9/2015 | Knapp | |
| 2016/0104111 A1 | 4/2016 | Jones | |
| 2016/0271796 A1 | 9/2016 | Babu | |
| 2017/0050282 A1 | 2/2017 | Kruck | |
| 2017/0277179 A1 | 9/2017 | Bhageria | |
| 2018/0137454 A1 | 5/2018 | Kulkarni | |
| 2018/0314246 A1 | 11/2018 | Bhageria | |
| 2019/0112134 A1 * | 4/2019 | Ooba | G05B 19/4182 |
| 2019/0369641 A1 * | 12/2019 | Gillett | G05D 1/0088 |

OTHER PUBLICATIONS

FANUC Robotics; FANUC R-2000iB "Flying Robots" in Camshaft Machining Center; May 11, 2012; Retrieved from the Internet Jan. 8, 2016; URL: https://www.youtube.com/watch~v=4TOotC_Q3sU; 3 pages.

Friedman, Mark J.; List of IBM Patents or Patent Applications Treated as Related; Jul. 9, 2018; 1 page.

Furiousdriving; Car Factory—Kia Sportage factory production line; Jan. 7, 2012; Retrieved from the Internet Jan. 8, 2016; URL: https://www.youtube.com/watch?v=sjAZGUcjrP8; 4 pages.

Golson, Jordan; Our Robot Forces are Coming: A Drone Just Refueled Mid-Air; Wired; Apr. 29, 2015; Retrieved from the Internet Jan. 8, 2016; URL: http://www.wired.com/2015/04/robot-forces-coming-drone-just-refueled . . . ; 5 pages.

Held@RockPoint; Nissan Factory Life: How Cars are Built; Feb. 4, 2013; Retrieved from the Internet Jan. 8, 2016; URL: https://www.youtube.com/watch?v=Ewtjgpsd2Nc; 2 pages.

Knepper, Ross A. et al.; IkeaBot: An Autonomous Multi-Robot Coordinated Furniture Assembly System; 2013 IEEE International Conference on Robotics and Automation; May 6-10, 2013; pp. 855-862.

Researchers Demonstrate Swarm Robot Behaviour Coordinated by Flying Drones; Oct. 2, 2012; Retrieved from the Internet Jan. 8, 2016; URL: http://www.33rdsquare.com/2012/10/researchers-demonstrate-swarm-robot.html; 3 pages.

Singh, Sanjiv; TRESTLE: Autonomous Assembly by Teams of Coordinated Robots; Carnegie Mellon University, The Robotics Institute; Retrieved from the Internet Jan. 8, 2016; URL: https://www.ri.cmu.edu/research_project_detail.html?project_id=532& . . . ; 2 pages.

Stentz, Tony; Multi-Robot Planning and Coordination; Retrieved from the Internet Jan. 8, 2016; URL: http://www.frc.ri.cmu.edu/~axs/multi-robot.html; 18 pages.

The Kim Komando Show; Inside Amazon's robot-human assembly line; Aug. 3, 2015; Retrieved from the Internet Jan. 8, 2016; URL: https://www.youtube.com/watch?v=6WasrevBxJU; 2 pages.

TheDmel; Aggressive Maneuvers for Autonomous Quadrotor Flight; May 21, 2010; Retrieved from the Internet Jan. 8, 2016; URL: https://www.youtube.com/wathc?v=MvRTALJp8DM; 3 pages.

Thielman, Sam; Robot swarms: scientists work to harness the power of the insect world; The Guardian; Sep. 18, 2015; 2 pages.

* cited by examiner

COORDINATING ROBOTIC APPARATUS DELIVERIES

CROSS REFERENCE TO RELATED APPLICATIONS

This application is a continuation application claiming priority to Ser. No. 16/030,040 filed Jul. 9, 2018, now U.S. Pat. No. 10,576,634 issued Mar. 3, 2020, which is a continuation application claiming priority to Ser. No. 15/081,241 filed Mar. 25, 2016, U.S. Pat. No. 10,078,330 issued Sep. 18, 2018, the contents of which are hereby incorporated by reference.

FIELD

The present invention relates generally to a method for supplying parts to a robotic apparatus and in particular to a method and associated system for coordinating vehicles for supplying parts to a robotic apparatus on an assembly line.

BACKGROUND

Supplying components for manufacturing typically includes an inaccurate process with little flexibility. Coordinating component supplies typically involves an unreliable process. Controlling and directing various supply means with respect to apparatuses in need of additional supplies may include a complicated process that may be time consuming and require a large amount of resources. Accordingly, there exists a need in the art to overcome at least some of the deficiencies and limitations described herein above.

SUMMARY

A first aspect of the invention provides a An automated assembly line delivery method comprising: generating, by a processor of an embedded computing device, an action plan specifying movements associated with a robotic apparatus associated with an assembly line, items required for the assembly line, and a vehicle associated with providing the items for the robotic apparatus; executing, by the processor, the action plan; directing, by the processor in response to a command from a user, the vehicle to a location comprising the items such that the vehicle initiates motion and navigates in a specified direction towards the location; selecting, by the processor via the vehicle upon arriving at the location, a first item of the items; retrieving, by the processor via the vehicle, the first item; determining, by the processor based on a feedback signal generated by the vehicle in response to the retrieving, a measured weight of the first item; comparing, by the processor, the measured weight to a predetermined maximum weight threshold for delivery by the vehicle; executing, by the processor based on results of the comparing, a delivery process with respect to the vehicle, the first item, and the robotic apparatus; and transmitting, by the processor to the robotic apparatus, a notification indicating details associated with the delivery process.

A second aspect of the invention provides a computer program product, comprising a computer readable hardware storage device storing a computer readable program code, the computer readable program code comprising an algorithm that when executed by a processor of an embedded computing device implements an automated assembly line delivery method, the method comprising: generating, by the processor, an action plan specifying movements associated with a robotic apparatus associated with an assembly line, items required for the assembly line, and a vehicle associated with providing the items for the robotic apparatus; executing, by the processor, the action plan; directing, by the processor in response to a command from a user, the vehicle to a location comprising the items such that the vehicle initiates motion and navigates in a specified direction towards the location; selecting, by the processor via the vehicle upon arriving at the location, a first item of the items; retrieving, by the processor via the vehicle, the first item; determining, by the processor based on a feedback signal generated by the vehicle in response to the retrieving, a measured weight of the first item; comparing, by the processor, the measured weight to a predetermined maximum weight threshold for delivery by the vehicle; executing, by the processor based on results of the comparing, a delivery process with respect to the vehicle, the first item, and the robotic apparatus; and transmitting, by the processor to the robotic apparatus, a notification indicating details associated with the delivery process.

A third aspect of the invention provides a An embedded computer device comprising a processor coupled to a computer-readable memory unit, the memory unit comprising instructions that when executed by the processor executes an automated assembly line delivery method comprising: generating, by the processor, an action plan specifying movements associated with a robotic apparatus associated with an assembly line, items required for the assembly line, and a vehicle associated with providing the items for the robotic apparatus; executing, by the processor, the action plan; directing, by the processor in response to a command from a user, the vehicle to a location comprising the items such that the vehicle initiates motion and navigates in a specified direction towards the location; selecting, by the processor via the vehicle upon arriving at the location, a first item of the items; retrieving, by the processor via the vehicle, the first item; determining, by the processor based on a feedback signal generated by the vehicle in response to the retrieving, a measured weight of the first item; comparing, by the processor, the measured weight to a predetermined maximum weight threshold for delivery by the vehicle; executing, by the processor based on results of the comparing, a delivery process with respect to the vehicle, the first item, and the robotic apparatus; and transmitting, by the processor to the robotic apparatus, a notification indicating details associated with the delivery process.

The present invention advantageously provides a simple method and associated system capable of supplying components for manufacturing.

DETAILED DESCRIPTION

Figure 1:
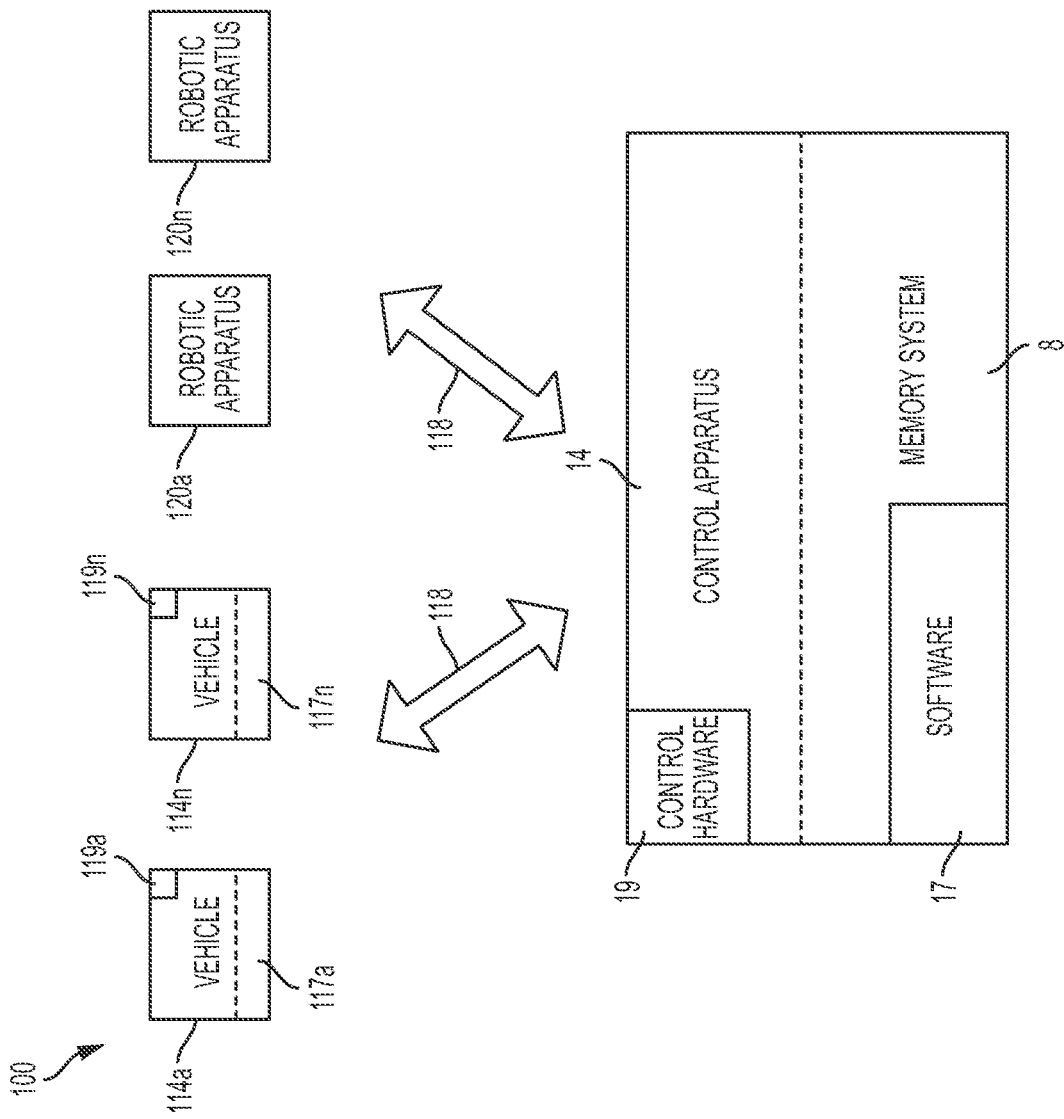
FIG. 1 illustrates a system coordinating vehicles for supplying items to robotic apparatuses on an assembly line, in accordance with embodiments of the present invention.

FIG. 1 illustrates a system 100 for coordinating vehicles 114a ... 114n for supplying items 117a ... 117n to robotic apparatuses 120a ... 120n on an assembly line, in accordance with embodiments of the present invention. System 100 enables a process for coordinating assembly line item management by:
1. Coordinating vehicles 114a ... 114n with robotic apparatuses 120a ... 120n in an assembly shop to enable required items 117a ... 117n (e.g., parts, tools, etc.) to be available in such a way that robotic arm movement is minimized during robotic assembly of components on an assembly line.
2. Identifying required items (e.g., of items 117a ... 117n) with respect to robotic apparatuses 120a ... 120n in the assembly shop. In response, one of vehicles 114a ... 114n retrieves the identified items from associated storage locations and delivers the items in a location adjacent to a robotic arm of an associated one of robotic apparatuses 120a ... 120n. If the item is too heavy for a single robotic apparatus, then two or more robotic apparatuses will retrieve the identified item from associated storage locations and delivers the item to a location adjacent to the robotic are.
3. Dynamically identifying a position and travel route for vehicles 114a ... 114n (carrying required items to the robotic apparatuses) based the following factors:
   a. A maximum number of robotic apparatuses capable of being supported.
   b. An assembly location.
   c. A proactively calculated robotic arm movement path to prevent a collision with a vehicle.

System 100 of FIG. 1 includes a control apparatus 14 in communication with vehicles 114a ... 114n (comprising items 117a ... 117n such as, inter alia, assembly line parts, tools, etc.) and robotic apparatuses 120a ... 120n via a wireless network 118. Vehicles 114a ... 114n (i.e., control hardware 119a ... 119n internal to vehicles 114a ... 114n) and control apparatus 14 each may comprise an embedded computer. An embedded computer is defined herein as a remotely portable dedicated computer comprising a combination of computer hardware and software (fixed in capability or programmable) specifically designed for executing a specialized function. Programmable embedded computers may comprise specialized programming interfaces. Additionally, vehicles 114a ... 114n (i.e., control hardware 119a ... 119n internal to vehicles 114a ... 114n vehicles) and control apparatus 14 may each comprise a specialized hardware device comprising specialized (non-generic) hardware and circuitry (i.e., specialized discrete non-generic analog, digital, and logic based circuitry) for executing a process described with respect to FIGS. 1-3. The specialized discrete non-generic analog, digital, and logic based circuitry may include proprietary specially designed components (e.g., a specialized integrated circuit designed for only implementing an automated process for coordinating vehicles 114a ... 114n for supplying items 117a ... 117n to robotic apparatuses 120a ... 120n on an assembly line). Monitoring/control apparatus 14 includes a memory system 8, software 17, and control hardware 19 (all sensors and associated control hardware for enabling software 17 to execute a process for coordinating vehicles 114a ... 114n for supplying items 117a ... 117n to robotic apparatuses 120a ... 120n on an assembly line). Control hardware 119a ... 119n may include sensors. Sensors may include, inter alia, GPS sensors, video recording devices, optical sensors, weight sensors, etc. The memory system 8 may include a single memory system. Alternatively, the memory system may include a plurality of memory systems. Each of vehicles 114a ... 114n may comprise any vehicle that does not require a human operator to be located within the vehicles 114a ... 114n such as, inter alia, a remote controlled vehicle (e.g., an aircraft flown by a pilot at a ground control station), an autonomously controlled vehicle (e.g., an aircraft controlled based on pre-programmed flight plans and may include an intelligence algorithm that would enable vehicles 114a ... 114n to know it's location and self-determine a an item delivery route), a pre-programmed vehicle, etc. Alternatively, vehicles 114a ... 114n may comprise any type of vehicle that includes a human operator located within the vehicle (e.g., an aircraft, an automobile, a boat or ship, a train, etc.). Vehicles 114a ... 114n may include, inter alia, an aerial vehicle, a land based vehicle, a marine (water) based vehicle, etc.

System 100 of FIG. 1 enables each of robotic apparatuses 120a ... 120n to estimate its action steps within a next "t" seconds and report the estimate to control apparatus. An action step is defined herein as a robotic arm displacement from an x coordinate to a y coordinate in order to fetch a z object at a location 1. The action steps are provided as an input to a scheduling engine. Additionally, a current location, power, and speed of vehicles 114a ... 114n are provided as an input to the scheduling engine. The scheduling engine is enabled to optimize a delivery plan (using the aforementioned inputs) for reducing a utility factor to optimize assembly by reducing robotic-arm movements. Based on the utility factor, vehicles 114a ... 114n coordinate with each other as well as with the robotic apparatuses 120a ... 120n.

Figure 2:
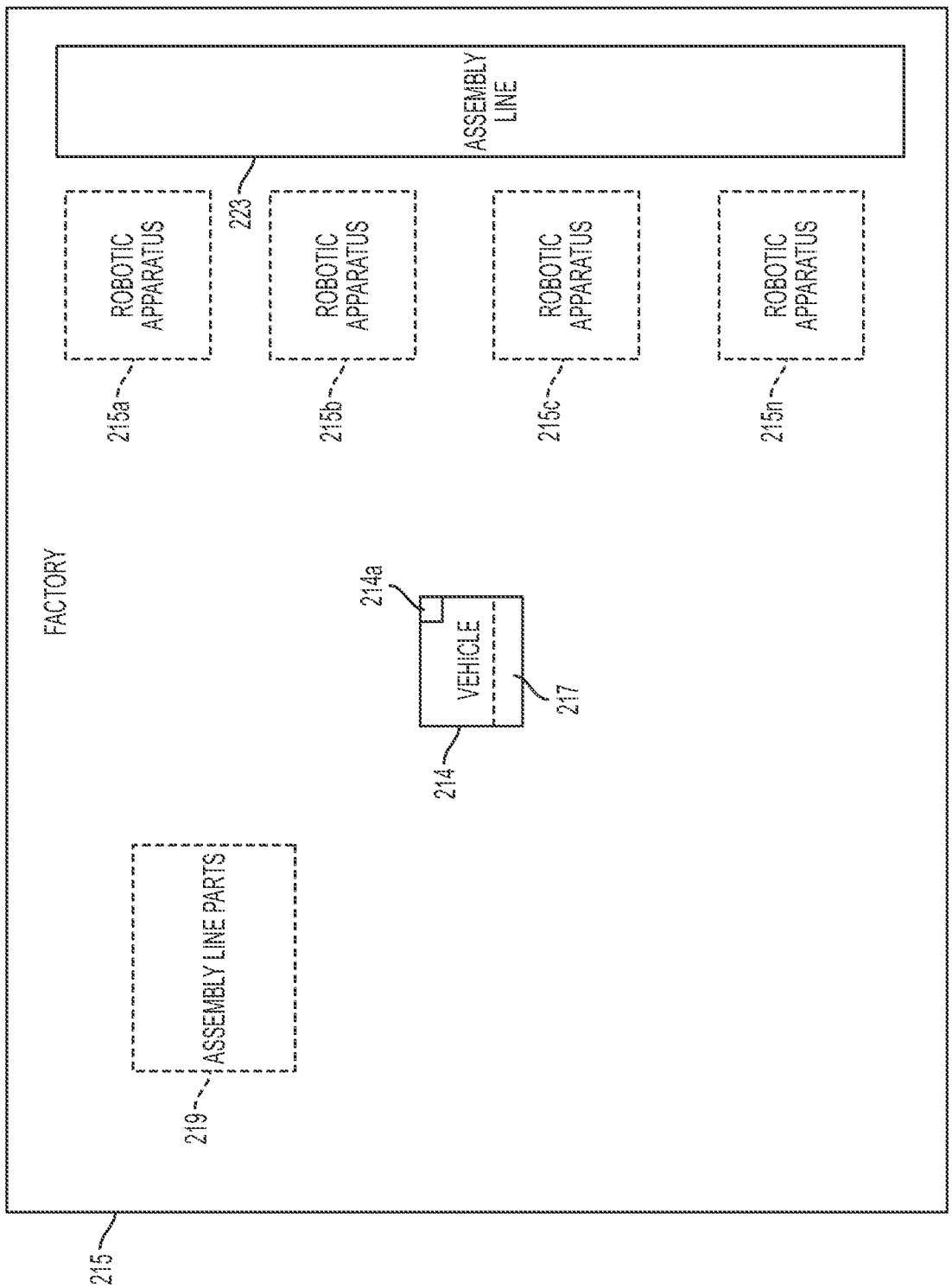
FIG. 2 illustrates a factory comprising an assembly line parts structure, robotic apparatuses, and an assembly line structure, in accordance with embodiments of the present invention.

FIG. 2 illustrates a factory 215 comprising an assembly line parts structure 219, robotic apparatuses 215a ... 215n, and an assembly line structure 223 (e.g., comprising assembly items on a conveyer belt), in accordance with embodiments of the present invention. Vehicle 214 comprises control hardware 214a including sensors as described with respect to FIG. 1, supra. Additionally, vehicle 214 may be retrieving items 217 from assembly line parts structure 219 for coordinating vehicle 214 for supplying items 217 ... 117n to robotic apparatuses 215a ... 215n for structure assembly on an assembly line. Each of robotic apparatuses 215a ... 215n comprises any type of robotic structure for use on a factory assembly line such as a robotic arm mechanism.

Figure 3:
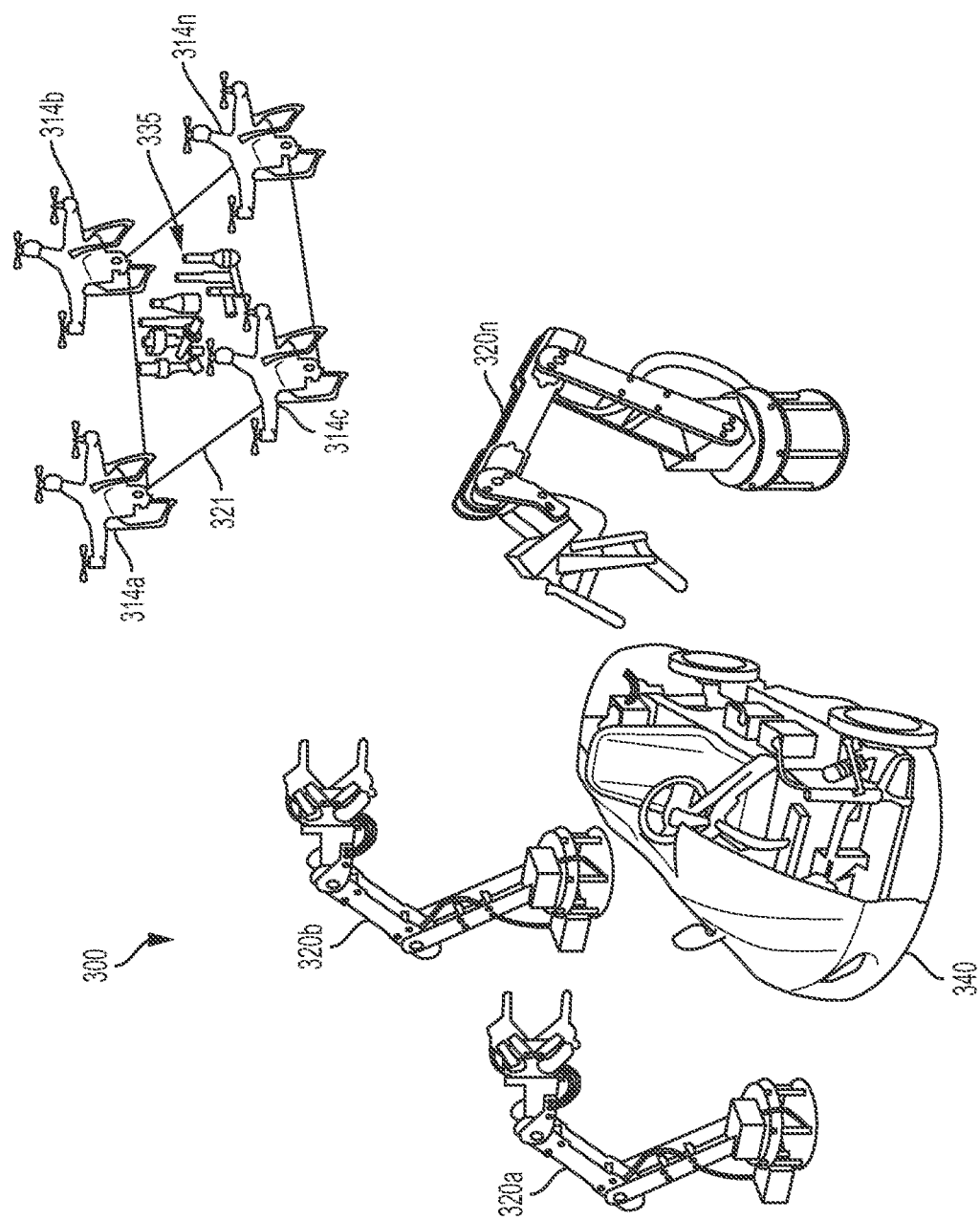
FIG. 3 illustrates an assembly line system enabled by the system of FIG. 1 for coordinating vehicles for supplying items to robotic apparatuses on an assembly line, in accordance with embodiments of the present invention.

FIG. 3 illustrates an assembly line system 300 enabled by system 100 of FIG. 1 for coordinating vehicles for supplying items to robotic apparatuses on an assembly line, in accordance with embodiments of the present invention. System 300 comprises a plurality of vehicles 314a ... 314n carrying (in combination) a platform (or tray) 321 retaining multiple assembly line parts or tools 335. Vehicles 314a ... 314n collect the assembly line parts or tools 335 dynamically in response to a predicted request from any of robotic apparatuses 320a ... 320n. Platform 321 is carried by vehicles 314a ... 314n towards a required assembly point (e.g., an automobile 340 for assembly). The assembly line parts or tools 335 are delivered near any of robotic apparatuses 320a ... 320n such that with minimum movement, a robotic apparatus may collect a required one of assembly line parts or tools 335. A centralized control apparatus will proactively identify a required item and the required item will be delivered to an associated one of robotic apparatuses 320a . . . 320n. The following process is enabled by system 300 of FIG. 3:

1. System 300 enables a plan for minimizing robotic arm movement and recommends a vehicle to support a robotic apparatus.
2. System 300 coordinates with a vehicle and robotic apparatus to instruct the vehicle to initiate motion and provide items to the robotic apparatus. If the item is too heavy for a single vehicle, a request is transmitted to multiple vehicles to secure and deliver the item to the robotic apparatus
3. The vehicle(s) communicates with the robotic apparatus to verify that robotic arms do not become an obstacle to the delivery vehicle(s).
4. The robotic apparatus retrieves and delivers the item.

Figure 4:
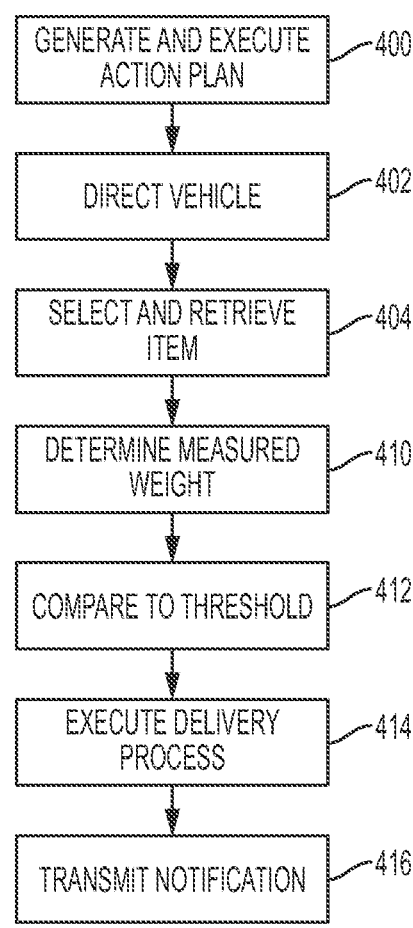
FIG. 4 illustrates an algorithm detailing a process flow enabled by the system of FIG. 1 for coordinating vehicles for supplying items to robotic apparatuses on an assembly line, in accordance with embodiments of the present invention.

FIG. 4 illustrates an algorithm detailing a process flow enabled by system 100 of FIG. 1 for coordinating vehicles for supplying items to robotic apparatuses on an assembly line, in accordance with embodiments of the present invention. Each of the steps in the algorithm of FIG. 4 may be enabled and executed in any order by a computer processor(s) or any type of specialized hardware executing computer code. In step 400, an action plan is generated and executed. The action plan specifies movements associated with a robotic apparatus associated with an assembly line, items required for the assembly line, and a vehicle associated with providing the items for the robotic apparatus. Generating the action plan may include generating an estimated timeframe associated with movement of a robotic arm of the robotic apparatus with respect to a movement distance from a first coordinate to a second coordinate to fetch any items from the vehicle providing the items for the robotic apparatus.

In step 402, the vehicle is directed to a location storing the items such that the vehicle initiates motion and navigates in a specified direction towards the location. In step 404, an item is selected and retrieved via the vehicle. In step 410, a measured weight of the item is determined (via e.g., a weight sensor within the vehicle). In step 412, the measured weight is compared to a predetermined maximum weight threshold for delivery by the vehicle. In step 414, a delivery process with respect to the vehicle, the item, and the robotic apparatus is executed. If results of the comparison of step 412 indicate that the measured weight is less than the predetermined maximum weight threshold, then the delivery process includes: transmitting a command instructing the vehicle to secure the item, directing the vehicle comprising the item secured, to an assembly location of the robotic apparatus, and releasing the item to the robotic apparatus. If results of the comparison of step 412 indicate that the measured weight exceeds the predetermined maximum weight threshold, then the delivery process includes: requesting an additional vehicle(s) for said executing the delivery process, detecting the additional vehicle arriving at the location comprising the items, transmitting a command instructing the vehicle and the additional vehicle to secure (in combination) the item, directing the vehicle and the additional vehicle (comprising the item secured) to an assembly location of the robotic apparatus, releasing the item to the robotic apparatus. In step 416, a notification indicating details associated with the delivery process is transmitted to the robotic apparatus. The notification may indicate: a specified receiving position for the robotic apparatus during delivery of the item and/or a specified time period for delivery of the item to the robotic apparatus.

Figure 5:
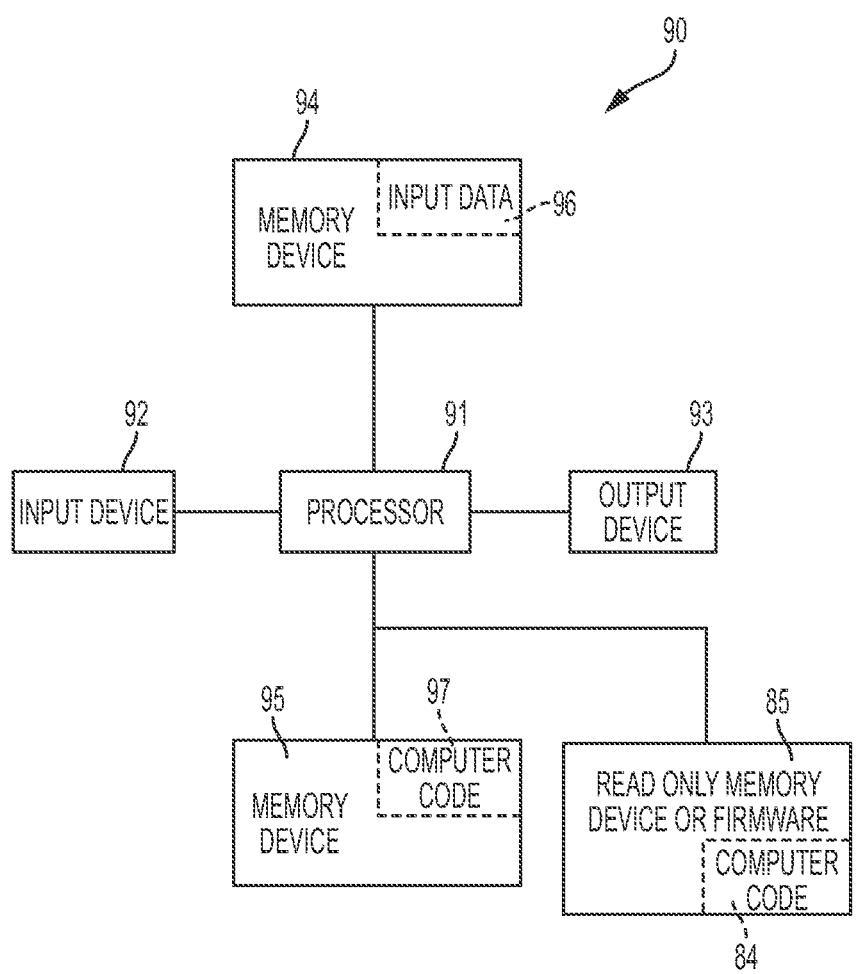
FIG. 5 illustrates a computer system used by the system of FIG. 1 for enabling a process for coordinating vehicles for supplying items to robotic apparatuses on an assembly line, in accordance with embodiments of the present invention.

FIG. 5 illustrates a computer system 90 (e.g., control hardware 119a . . . 119n internal to vehicles 114a . . . 114n and control apparatus 14) used by or comprised by the systems of FIG. 1 and FIG. 2 for enabling a process for supplying items to robotic apparatuses on an assembly line, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 4) for enabling a process for enabling a process for supplying items to robotic apparatuses on an assembly line. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms (e.g., the algorithm of FIG. 4) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithm) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to enable a process for supplying items to robotic apparatuses on an assembly line Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for enabling a process for supplying items to robotic apparatuses on an assembly line. In another embodiment, the invention provides a business method that performs the process steps of the invention on a subscription, advertising, and/or fee basis. That is, a service supplier, such as a Solution Integrator, could offer to enable a process for enabling a process for supplying items to robotic apparatuses on an assembly line. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An automated assembly line delivery method comprising:
generating, by a processor of an embedded computing device, an action plan specifying movements associated with a robotic apparatus associated with an assembly line, items required for said assembly line, and a vehicle associated with providing said items for said robotic apparatus, wherein said vehicle comprises a remotely or autonomously controlled aerial vehicle configured to aerially provide said items for said robotic apparatus;
directing, by said processor in response to a command from a user and execution of said action plan, said vehicle to a location comprising said items such that said vehicle initiates motion and navigates in a specified direction towards said location;
determining, by said processor based on a feedback signal generated by a weight sensor of said vehicle in response to retrieving a first item of said items, a measured weight of said first item;
comparing, by said processor, said measured weight to a predetermined maximum weight threshold for delivery by said vehicle;
instructing, by said processor based on results of said comparing, said vehicle to retrieve a platform for carrying said first item such that said vehicle navigates to retrieve said platform; and
executing, by said processor based on results of said comparing, a delivery process with respect to said vehicle, said platform, said first item, and said robotic apparatus, wherein said executing said delivery process comprises generating a flight based travel route for said vehicle for travel from said location to said robotic apparatus, wherein said travel route is generated based on a maximum number of robotic apparatuses capable of being supported by said vehicle and a calculated robotic arm movement path configured to prevent a collision between said vehicle and said robotic apparatus such that said robotic apparatus is determined to not be an obstacle to said vehicle.

2. The method of claim 1, wherein said results of said comparing indicate that said measured weight is less than said predetermined maximum weight threshold, and wherein said delivery process comprises:
transmitting, by said processor to said vehicle, a command instructing said vehicle to secure said first item, wherein said vehicle secures said first item in response to said command;
directing, by said processor in response to said command, said vehicle comprising said first item secured, to an assembly location of said robotic apparatus; and
releasing, by said processor via said vehicle at said assembly location, said item to said robotic apparatus.

3. The method of claim 1, wherein said results of said comparing indicate that said measured weight exceeds said predetermined maximum weight threshold, and wherein said delivery process comprises:
requesting, by said processor, at least one additional vehicle for said executing said delivery process;
detecting, by said processor, said at least one additional vehicle arriving at said location comprising said items;
transmitting, by said processor to said vehicle, a command instructing said vehicle and said least one additional vehicle to secure said first item, wherein said vehicle and said least one additional vehicle secure, in combination, said first item in response to said command;
directing, by said processor in response to said command, said vehicle and said at least one additional vehicle comprising said first item secured, to an assembly location of said robotic apparatus; and
releasing, by said processor via said vehicle and said least one additional vehicle, said item to said robotic apparatus.

4. The method of claim 1, wherein said notification indicates a specified receiving position for said robotic apparatus during delivery of said first item.

5. The method of claim 1, wherein said notification indicates a specified time period for delivery of said first item to said robotic apparatus.

6. The method of claim 1, wherein said generating said action plan comprises:
generating an estimated timeframe associated with movement of a robotic arm of said robotic apparatus with respect to a movement distance from a first coordinate to a second coordinate to fetch any of said items from said vehicle providing said items for said robotic apparatus.

7. The method of claim 1, further comprising:
retrieving, by said processor, current locations, a current power, and a current speed of multiple vehicles that in combination with said vehicle are further associated with providing said items for said robotic apparatus, and wherein said action plan comprises said current locations, said current power, and said current speed of multiple vehicles.

8. The method of claim 1, further comprising:
providing at least one support service for at least one of creating, integrating, hosting, maintaining, and deploying computer-readable code in the control hardware, said code being executed by the computer processor to implement: said generating, said directing, said selecting, said determining, said comparing, and said executing said delivery process.

9. A computer program product, comprising a computer readable hardware storage device storing a computer readable program code, said computer readable program code comprising an algorithm that when executed by a processor of an embedded computing device implements an automated assembly line delivery method, said method comprising:

generating, by said processor, an action plan specifying movements associated with a robotic apparatus associated with an assembly line, items required for said assembly line, and a vehicle associated with providing said items for said robotic apparatus, wherein said vehicle comprises a remotely or autonomously controlled aerial vehicle configured to aerially provide said items for said robotic apparatus;

directing, by said processor in response to a command from a user and execution of said action plan, said vehicle to a location comprising said items such that said vehicle initiates motion and navigates in a specified direction towards said location;

determining, by said processor based on a feedback signal generated by a weight sensor of said vehicle in response to retrieving a first item of said items, a measured weight of said first item;

comparing, by said processor, said measured weight to a predetermined maximum weight threshold for delivery by said vehicle;

instructing, by said processor based on results of said comparing, said vehicle to retrieve a platform for carrying said first item such that said vehicle navigates to retrieve said platform; and executing, by said processor based on results of said comparing, a delivery process with respect to said vehicle, said platform, said first item, and said robotic apparatus, wherein said executing said delivery process comprises generating a flight based travel route for said vehicle for travel from said location to said robotic apparatus, wherein said travel route is generated based on a maximum number of robotic apparatuses capable of being supported by said vehicle and a calculated robotic arm movement path configured to prevent a collision between said vehicle and said robotic apparatus such that said robotic apparatus is determined to not be an obstacle to said vehicle.

10. The computer program product of claim 9, wherein said results of said comparing indicate that said measured weight is less than said predetermined maximum weight threshold, and wherein said delivery process comprises:

transmitting, by said processor to said vehicle, a command instructing said vehicle to secure said first item, wherein said vehicle secures said first item in response to said command;

directing, by said processor in response to said command, said vehicle comprising said first item secured, to an assembly location of said robotic apparatus; and releasing, by said processor via said vehicle at said assembly location, said item to said robotic apparatus.

11. The computer program product of claim 9, wherein said results of said comparing indicate that said measured weight exceeds said predetermined maximum weight threshold, and wherein said delivery process comprises:

requesting, by said processor, at least one additional vehicle for said executing said delivery process;

detecting, by said processor, said at least one additional vehicle arriving at said location comprising said items;

transmitting, by said processor to said vehicle, a command instructing said vehicle and said least one additional vehicle to secure said first item, wherein said vehicle and said least one additional vehicle secure, in combination, said first item in response to said command;

directing, by said processor in response to said command, said vehicle and said at least one additional vehicle comprising said first item secured, to an assembly location of said robotic apparatus; and releasing, by said processor via said vehicle and said least one additional vehicle, said item to said robotic apparatus.

12. The computer program product of claim 9, wherein said notification indicates a specified receiving position for said robotic apparatus during delivery of said first item.

13. The computer program product of claim 9, wherein said notification indicates a specified time period for delivery of said first item to said robotic apparatus.

14. The computer program product of claim 9, wherein said generating said action plan comprises:

generating an estimated timeframe associated with movement of a robotic arm of said robotic apparatus with respect to a movement distance from a first coordinate to a second coordinate to fetch any of said items from said vehicle providing said items for said robotic apparatus.

15. The computer program product of claim 9, further comprising:

retrieving, by said processor, current locations, a current power, and a current speed of multiple vehicles that in combination with said vehicle are further associated with providing said items for said robotic apparatus, and wherein said action plan comprises said current locations, said current power, and said current speed of multiple vehicles.

16. An embedded computer device comprising a processor coupled to a computer-readable memory unit, said memory unit comprising instructions that when executed by the processor executes an automated assembly line delivery method comprising:

generating, by said processor, an action plan specifying movements associated with a robotic apparatus associated with an assembly line, items required for said assembly line, and a vehicle associated with providing said items for said robotic apparatus, wherein said vehicle comprises a remotely or autonomously controlled aerial vehicle configured to aerially provide said items for said robotic apparatus;

directing, by said processor in response to a command from a user and execution of said action plan, said vehicle to a location comprising said items such that said vehicle initiates motion and navigates in a specified direction towards said location;

determining, by said processor based on a feedback signal generated by a weight sensor of said vehicle in response to retrieving a first item of said items, a measured weight of said first item;

comparing, by said processor, said measured weight to a predetermined maximum weight threshold for delivery by said vehicle; instructing, by said processor based on results of said comparing, said vehicle to retrieve a platform for carrying said first item such that said vehicle navigates to retrieve said platform; and executing, by said processor based on results of said comparing, a delivery process with respect to said vehicle, said platform, said first item, and said robotic apparatus, wherein said executing said delivery process comprises generating a flight based travel route for said vehicle for travel from said location to said robotic apparatus, wherein said travel route is generated based on a maximum number of robotic apparatuses capable of being supported by said vehicle and a calculated robotic arm movement path configured to prevent a collision between said vehicle and said robotic apparatus such that said robotic apparatus is determined to not be an obstacle to said vehicle.

17. The embedded computer device of claim 16, wherein said results of said comparing indicate that said measured weight is less than said predetermined maximum weight threshold, and wherein said delivery process comprises:
   transmitting, by said processor to said vehicle, a command instructing said vehicle to secure said first item, wherein said vehicle secures said first item in response to said command;
   directing, by said processor in response to said command, said vehicle comprising said first item secured, to an assembly location of said robotic apparatus; and
   releasing, by said processor via said vehicle at said assembly location, said item to said robotic apparatus.

18. The embedded computer device of claim 16, wherein said results of said comparing indicate that said measured weight exceeds said predetermined maximum weight threshold, and wherein said delivery process comprises:
   requesting, by said processor, at least one additional vehicle for said executing said delivery process;
   detecting, by said processor, said at least one additional vehicle arriving at said location comprising said items;
   transmitting, by said processor to said vehicle, a command instructing said vehicle and said least one additional vehicle to secure said first item, wherein said vehicle and said least one additional vehicle secure, in combination, said first item in response to said command;
   directing, by said processor in response to said command, said vehicle and said at least one additional vehicle comprising said first item secured, to an assembly location of said robotic apparatus; and
   releasing, by said processor via said vehicle and said least one additional vehicle, said item to said robotic apparatus.

19. The embedded computer device of claim 16, wherein said notification indicates a specified receiving position for said robotic apparatus during delivery of said first item.

20. The embedded computer device of claim 16, wherein said notification indicates a specified time period for delivery of said first item to said robotic apparatus.

* * * * *